2,797,388
APPARATUS FOR MEASURING ATTENUATION

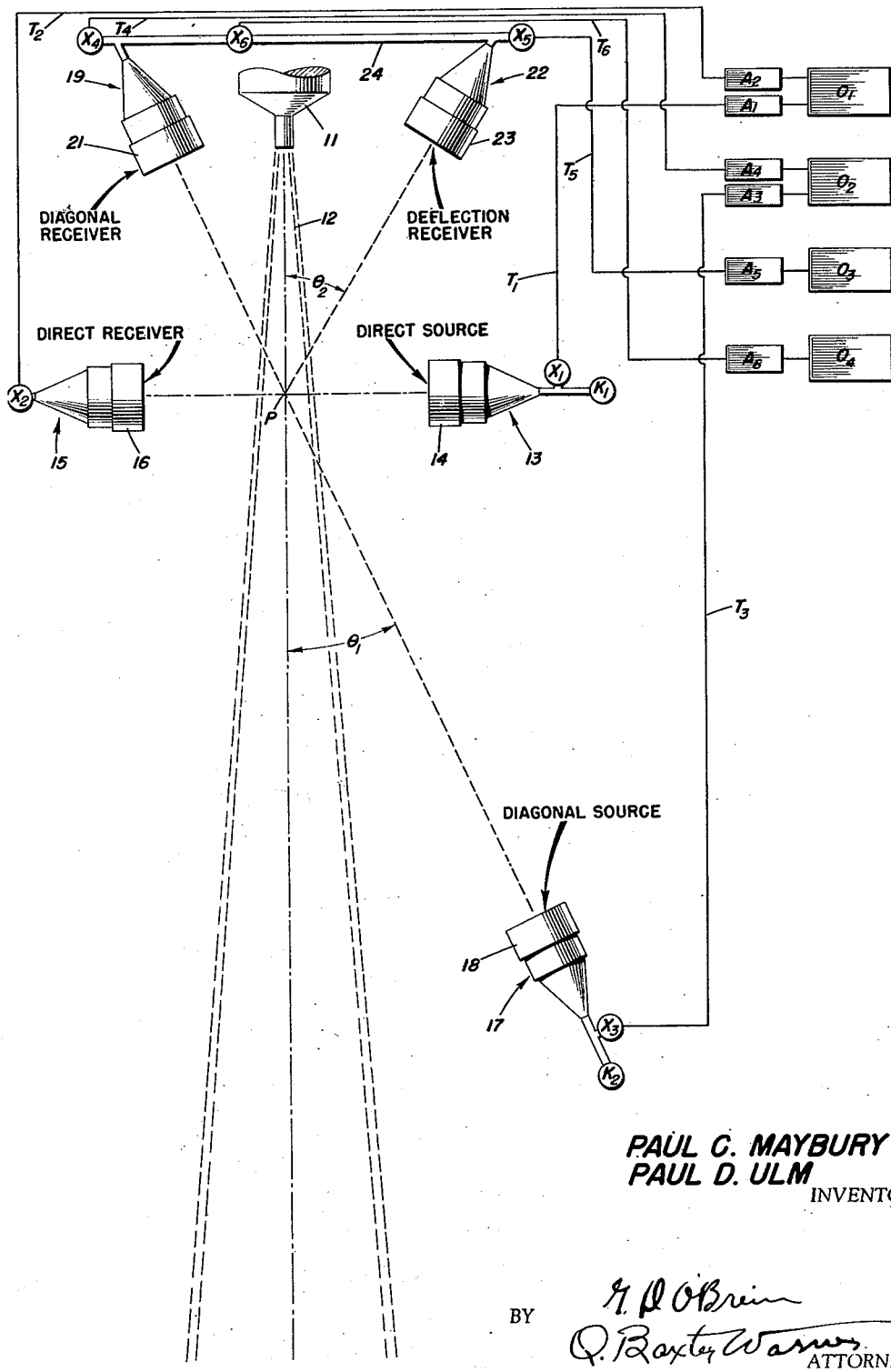

Paul C. Maybury, Wollaston, Mass., and Paul D. Ulm, Fort Wayne, Ind., assignors to the United States of America as represented by the Secretary of the Navy Application May 7, 1956, Serial No. 583,347

4 Claims. (Cl. 324—58.5)

The present invention relates to a method and apparatus for investigating the effects of an exhaust stream emitting from a reaction engine on the transmission of radio frequency (R. F.) energy.

Guided missiles are controlled in flight by a radar beam transmitted from the ground to the missile. The intelligence conveyed by the radar beam is accepted by the missile through antennas mounted on portions thereof. It has been found that the exhaust stream emitting from the propulsive unit of the missile affects the radar intelligence accepted thereby such that its receives erroneous instructions.

In order to provide a means for averting a possible deviation in flight of the missile which may result in a complete miss, it first has become necessary to study the effects of an exhaust stream comprising a propellant flame and combustion gases on the transmission of radio frequency energy.

It is, therefore, the principal object of this invention to provide a method and apparatus for measuring the absorption, refraction, and reflection effects of propellant flame and combustion gases on the transmission of radio frequency energy.

A further object of this invention is to provide a method and apparatus for separately measuring the effects of reflection from and absorption and refraction by the propellant flame and combustion gases on radio frequency energy.

Further objects and attendant advantages of the present invention will become evident from the following detailed description taken in conjunction with the accompanying drawing, in which the single figure is a schematic diagram of a test arrangement for carrying out the objects of this invention.

As shown in the figure, a rocket engine, a portion of which is shown at 11, is suitably mounted for operation and when operating emits an exhaust stream 12 comprising a propellant flame and combustion gases. A radio frequency energy transmitter 13, hereinafter referred to as the direct energy source which may include a klystron $K_1$ for generating an R. F. signal of constant power, is mounted so as to direct R. F. signals emitting therefrom into the exhaust stream 12 perpendicularly to the rocket engine axis. Mounted on the transmitter 13 is a focusing device 14 for converging R. F. energy emitting from said transmitter into a narrow beam. The device 14 may comprise a dielectric lens for refracting R. F. energy or it may comprise any one of the numerous focusing systems presently available. A crystal detector $X_1$ is connected to the klystron $K_1$ to receive generated signals directly therefrom for monitoring purposes, as will appear hereinafter.

Alined with the direct energy source 13 on the opposite side of the exhaust stream 12 is positioned an R. F. signal receiver 15 mounting a focusing device 16 similar to that mounted on the direct source 13, said receiver being henceforth called the direct energy receiver. The focal planes of the focusing devices 14 and 16, respectively, of the source 13 and receiver 15 coincide at a point P within the stream 12 so that signals concentrated at said point P are received by said receiver. A crystal detector $X_2$ senses the signal received by the receiver 15 and sends a rectified signal through a transmission line $T_2$ to a suitable amplifier $A_2$ and thence to an oscilloscope $O_1$ for evaluation purposes. The signal from the klystron $K_1$, as detected by the crystal detector $X_1$, is conducted along a transmission line $T_1$ through an amplifier $A_1$ to the oscilloscope $O_1$ for monitoring the performance of said klystron.

A second radio frequency energy transmitter 17, referred to hereinafter as the diagonal energy source, is directed into the stream 12 towards the rocket engine 11 at an angle $\theta_1$ to the axis thereof. As in the case of the direct energy source 13, the diagonal energy source may comprise a klystron $K_2$ with a crystal detector $X_3$ for monitoring purposes. The diagonal energy source 17 employs a focusing device 18 which is adapted to focus the R. F. signals of constant power emitting from said source at the point P within the exhaust stream 12. The focal length of the focusing device 18 employed with the diagonal energy source 17 is large enough so that the source and the device are located at a safe distance from the hot exhaust stream 12. An R. F. signal receiver 19, hereinafter referred to as the diagonal energy receiver, is alined with the diagonal energy source 17 on the opposite side of the exhaust stream 12 to receive transmitted signals from said source. The diagonal energy receiver 19 also mounts a focusing device 21. The focal plane of the focusing device 21 on the diagonal energy receiver 19 coincides with that of the focusing device 18 on the diagonal energy source 17 at the point P, said receiver picking up transmitted signals concentrating on said point. A crystal detector $X_4$ detects the received signals and conducts them through a suitable transmission line $T_4$ to an amplifier $A_4$ and thence to an oscilloscope $O_2$ where they are displayed on a screen for evaluation. The signal detected by the crystal detector $X_3$ connected directly to the klystron $K_2$, is conducted along a transmission line $T_3$ through an amplifier $A_3$ to the oscilloscope $O_2$ for monitoring the output of said klystron.

A third R. F. signal receiver 22, henceforth called the reflection receiver, is mounted at an angle $\theta_2$ to the exhaust stream axis equal to the angle $\theta_1$ at which the diagonal energy source 17 is directed into the exhaust stream 12. Thus, the reflection receiver 22 may be thought of as being capable of accepting diagonal energy source signals that are reflected from an imaginary plane passing vertically through the exhaust stream axis. The reflection receiver 22 includes a focusing device 23 having a focal plane at the point P and receives any signals reflected by the exhaust stream 12 from said point in the direction of said receiver. A crystal detector $X_5$ rectifies the received signals and passes them along a transmission line $T_5$ to an amplifier $A_5$ from which they are sent to an oscilloscope $O_3$. The reflection receiver 22 and the diagonal energy receiver 19 are connected to a sum mixer crystal detector $X_6$ by means of a waveguide 24. A transmission line $T_6$ connects the detector $X_6$ to an amplifier $A_6$ and thence to an oscilloscope $O_4$.

Cameras or other recording devices (not shown) may be used in conjunction with the oscilloscopes $O_1$, $O_2$, $O_3$, and $O_4$ to provide permanent data regarding information displayed by said oscilloscopes.

The investigation of the effects of the exhaust stream 12 on the transmission of R. F. energy is carried out as follows. The klystrons $K_1$ and $K_2$ are energized prior to firing the rocket propellant fuel and signals are transmitted from the direct enery source 13 and the diagonal energy source 17. By virtue of the focusing devices, 14 and 18, respectively, employed by the sources $K_1$ and $K_2$, almost all of the transmitted signals pass through the expected path of the exhaust stream and are received on the other side of said path by the respective receivers 15 and 19.

The received signals from the direct energy receiver 15 and the diagonal energy receiver 19 are conducted along the transmission lines $T_2$ and $T_4$, are appropriately amplified and then are transformed into visible traces on the oscilloscopes $O_1$ and $O_2$. These traces are indicative of transmission under normal conditions without interference from an exhaust stream and are used for purposes of comparison with traces of received signals during firing of the rocket propellant fuel. These latter traces are obtained in a similar manner to those derived before firing the propellant fuel. A comparison of the traces obtained during firing with those derived before firing provides an indication of the total attenuation due to the absorption, refraction and reflection of R. F. energy by the exhaust stream 12.

The oscilloscope $O_3$ exhibits signals detected by the crystal detector $X_5$, thus furnishing a visual representation of the transmitted wave energy that is reflected by the exhaust stream 12.

Similarly, the oscilloscope $O_4$ accepts signals sent from the crystal detector $X_6$ along the transmission line $T_6$ and amplified in the amplifier $A_6$. A trace is produced by the oscilloscope $O_4$ and is indicative of the sum of the signals received by the diagonal receiver 19 and the reflection receiver 22. This trace can be thought of as a representation of the amount of wave energy that is transmitted through the exhaust stream 12 plus the amount that is reflected from said exhaust stream. When this trace is compared with the trace of the oscilloscope $O_2$ representing total transmission from the diagonal source 17, i. e. before firing the propellant fuel, an approximation of the amount of attenuation due to absorption and/or refraction by the exhaust stream is obtained.

The crystal detectors $X_1$ and $X_3$, connected to the klystrons $K_1$ and $K_2$, measure the power outputs of said klystrons and send signals, representative of these outputs, through their transmission lines $T_1$ and $T_3$ to the oscilloscopes $O_1$ and $O_2$, respectively. These signals are exhibited by the oscilloscopes to provide a means for monitoring the signals transmitted through the expected path of the exhaust stream.

Obviously many other modifications and variations of the present invention are possible in the light of the above teachings. It is therefore to be understood that within the scope of the appended claims the invention may be practiced otherwise than as specifically described.

What is claimed is:

1. Apparatus for investigating the R. F. attenuation effects of an exhaust stream produced by the combustion of the propellant fuel of a reaction engine, comprising a source of radio frequency energy, means mounted on said source for focusing energy emitted by said source on said exhaust stream, a radio frequency energy receiver aligned with said source on the opposite side of said exhaust stream for receiving signals transmitted by said source, means mounted on said receiver for focusing said receiver on said exhaust stream, a second receiver directed towards the exhaust stream at an angle to the propagation axis of said source for receiving reflected energy from said exhaust stream, a detector, transmission lines connecting both of said receivers to said detector, and means receiving signals from said detector for displaying the sum of said signals.

2. Apparatus for investigating the electric signal attenuating effects of an exhaust stream of combustion particles from a reaction engine, comprising, a source of electric signals directed toward the stream, a visual indicator device, detector means on the source, means connecting the detector means to said device, an electric signal receiver positioned to receive signals from said source and passing through said stream, second detector means on the receiver and connected to the indicator device, said first and second detector means and said indicator device cooperating to provide indications of values of the signals prior and subsequent to the passage thereof through said stream, a second source of electric signals directed toward the stream, a second receiver positioned to receive signals from the second source, and a second indicator device connected to said second receiver and second source.

3. The arrangement recited in claim 2, including additionally a third receiver positioned to receive signals from said second source and refracted by the stream, and a third indicator device connected to said third receiver.

4. The arrangement recited in claim 2, including detector means connected between the second and third receivers, and a fourth indicator device connected to the last-mentioned detector means.

References Cited in the file of this patent
UNITED STATES PATENTS

| | | |
|---|---|---|
| 2,165,214 | Blau et al. | July 11, 1939 |
| 2,363,473 | Ryder | Nov. 21, 1944 |
| 2,659,860 | Breazeale | Nov. 17, 1953 |
| 2,703,079 | Argento | Mar. 1, 1955 |